(No Model.)

C. S. ELLIS.
LETTER BOX ALARM.

No. 323,129. Patented July 28, 1885.

WITNESSES:
Morris A. Clark
P. B. Turpin

INVENTOR.
Charles S. Ellis
By R.S. & A.P. Lacey
ATTYS

UNITED STATES PATENT OFFICE.

CHARLES S. ELLIS, OF MEMPHIS, TENNESSEE.

LETTER-BOX ALARM.

SPECIFICATION forming part of Letters Patent No. 323,129, dated July 28, 1885.

Application filed October 4, 1884. (No model.)

*To all whom it may concern:*

Be it known that I, CHARLES S. ELLIS, a citizen of the United States, residing at Memphis, in the county of Shelby and State of Tennessee, have invented certain new and useful Improvements in Letter-Box Alarms; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to letter-boxes and to automatically-operated signals connected therewith; and it consists in certain novel constructions, arrangements, and combinations of parts, hereinafter more fully described and claimed.

Figure 1:
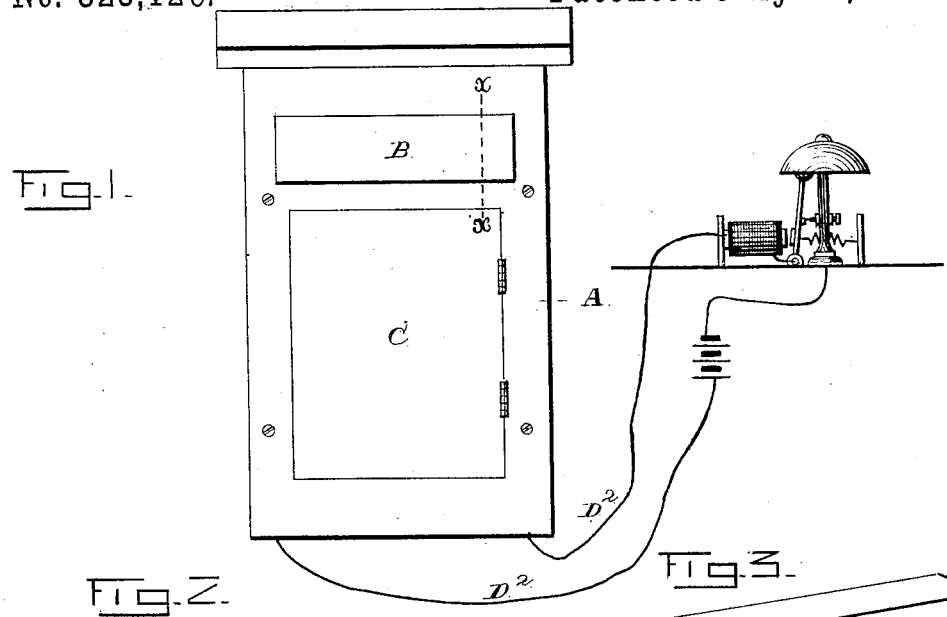
Figure 2:
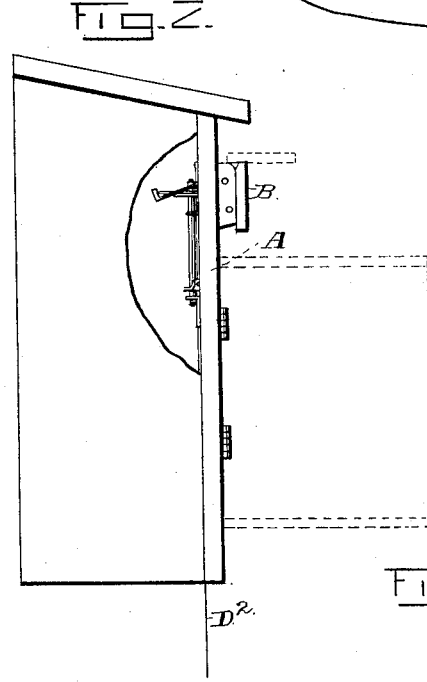
Figure 3:
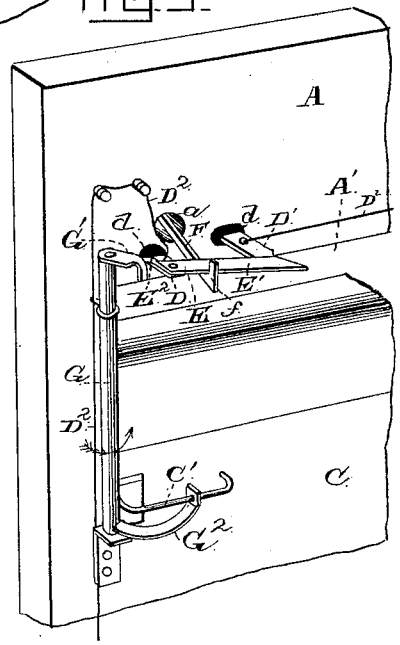
Figure 4:
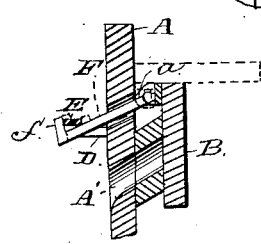

In the drawings, Figure 1 is a front and Fig. 2 a side view of my box. Fig. 3 is a perspective view of the inner side of a portion of the front board or plate of the box. Fig. 4 is a detached section on about line $x\,x$, Fig. 1.

In the front board or plate, A, of the box I form the slit or opening A', for letters or mail of other character, and over this slit arrange a covering flap or plate, B, which is hinged at or near its upper edge to the box. The box is also provided with a main door, C, arranged, preferably, below the slit B, and by opening which the contents of the box may be removed.

To the inner side of the plate A, close above the slit A', are secured suitable plates, D D', insulated at $d$, and forming one the positive and the other the negative pole of an electrical circuit. From these plates wires $D^2$ are extended, and connect with a proper battery and with a suitable alarm or signal in such manner that when the electrical circuit is completed the alarm will be sounded, and will continue to sound by the electrical current until the circuit is broken.

To effect the automatic completion and breaking of the circuit is the main object of my invention, and the batteries and signal may be of any desired form known to those skilled in the trade, and are thought to demand or require no illustration or detailed description in this application. A typical form of alarm is shown in Fig. 1; but it will be understood that any other form may be used.

To the plate D is pivoted the circuit-completing plate E, one end or arm, E', of which is movable into and out of contact with the plate D', and it is provided on the opposite side of its pivot with an arm or wing, $E^2$, which is engaged by an arm of the shaft, presently described.

A bar, F, is secured at one end to the flap B, below the hinge thereof, and extends thence through an opening, $a$, in the plate A, and is adapted at its inner end, $f$, to engage the arm E and draw same into contact with pole D' when the flap is raised, thus completing the circuit and causing the signal to ring, indicating to the proprietor that mail has been deposited in the box. The signal will continue to indicate until the circuit is broken. To accomplish this I journal the shaft G within the box and close to the hinged edge of the door C. From this shaft, at or near its upper end, I project a crank-arm, G', extended into position to engage arm $E^2$ of plate E, and break the circuit when the shaft G is partially rotated in the direction indicated by arrow in Fig. 3. To so rotate the shaft it is provided with a crank-arm, $G^2$, preferably curved, as shown, and connected with the door in suitable manner by means of a bail, C', as shown, or a link or other expedient, as desired.

As will be understood, the operation is as follows: When the door C is shut, the shaft G is partially rotated, and its crank G', engaging arm $E^2$ of plate E, breaks the circuit. The postman or other person delivering letters or packages raises flap B to deposit said articles in the box. This action, by means of bar F, actuates the plate E into contact with the pole D', completing the circuit and causing the signal to be given, which circuit will be broken by the opening of door C for the removal of the articles in the box.

In opening the door C the shaft G will be rotated in the direction of the arrow by reason of its crank-arm $G^2$ engaging the bail C, and crank G', engaging the heel of the arm $E^2$ of the plate E, which has been projected in its path by the opening of the flap, will push the same out of its path, thereby causing the plate E to resume its normal position, which is out of electrical contact with the plate D'.

In addition to its use on letter-boxes the invention might be employed with good results on bins or boxes such as are in common use in flats or compartment houses for receiving groceries or other stores, and so as to indicate to the proper tenant the arrival of the goods.

By my invention it will be seen an occupant of an upper-story room or room distant from the entrance of a dwelling or business house is notified at once on the delivery of letters or packages in his box and of their presence continually until they are removed.

Having thus described my invention, what I claim, and desire to secure by Letters Patent, is—

1. The combination, with the box having flap B and door C, of the plates D D', representing the positive and negative poles of an electric circuit, a plate, E, pivoted on plate D, and movable into contact with the plate D', the rod F, connected at one end with the flap B, and arranged to engage and actuate the plate E, and the shaft G, having a crank, G', arranged to engage the plate E, and a crank, $G^2$, connected with the door C, substantially as and for the purposes specified.

2. The combination of the box, the flap B, the door C, the plates D D', having attached wires $D^2$ $D^2$, the plate E, pivoted on plate D, and having its arm E' movable into and out of contact with plate D', and an arm, $E^2$, extended in rear of its pivot, a rod, F, attached at one end to the flap B, and having its other end adapted to engage arm E' and draw it into contact with plate D' when said flap B is raised, and the shaft G, having crank-arm $G^2$, connected with the door C, and crank-arm G', arranged to engage arm $E^2$ and actuate the plate E into contact with the plate D' when the door C is opened, substantially as set forth.

3. In combination with a letter-box having a flap and a door, the plates D D', representing the positive and negative poles of an electric circuit, a plate, E, pivoted on one of said plates and movable into contact with the other, and connections between said plate E and the box, flaps, and doors, substantially as set forth.

In testimony whereof I affix my signature in presence of two witnesses.

CHARLES S. ELLIS.

Witnesses:
E. MASON,
HUNSDON CARY.